Figure 1:
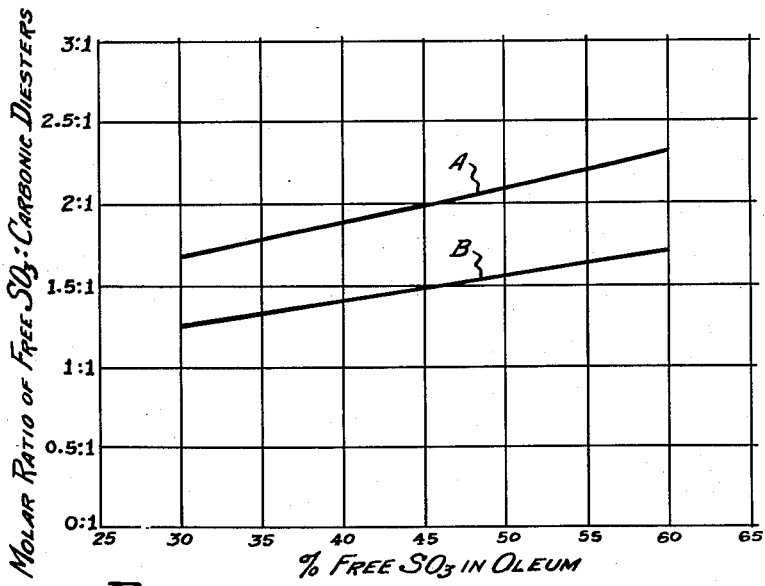

UNITED STATES PATENT OFFICE 2,626,264

WASHING AGENTS

John S. Brod, Wyoming, Ohio, and Ronald A. Henry, Inyokern, Calif., assignors to The Procter & Gamble Company, Cincinnati, Ohio, a corporation of Ohio Application January 31, 1950, Serial No. 141,504

20 Claims. (Cl. 260—400)

This invention relates to new wetting, sudsing and washing agents, and more particularly to the sulfonation products of certain high molecular diesters of carbonic acid.

It is a primary object of the invention to make available new wetting, sudsing and washing agents which can be produced readily from available sources and which are especially useful in hard water because they are not precipitated by the mineral constituents thereof and because their efficiency is not impaired by hard water. Other objects will become apparent in the description which follows.

The new wetting, sudsing and washing agents of our invention are sulfonation products of certain high molecular unsaturated diesters of carbonic acid. Dodecyl allyl carbonate,

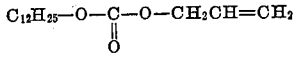

is illustrative of such diesters. Upon sulfonation (to be discussed hereinafter), these unsaturated diesters are attacked at the carbon-to-carbon double bond, and a variety of sulfonation products result, the character and relative proportions of which are to a degree dependent upon the conditions of sulfonation. These sulfonation products comprise a complex mixture illustrated by the following partial formulae of the sulfonated allyl end of the molecule:

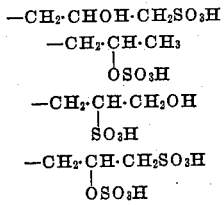

It will be understood that in such complex mixtures, exact analysis and identification of the constituents are not always possible. It is probable that some sulfonation products having formulae differing from those shown are also present in the sulfonation mixtures. It will further be understood that we use the term "sulfonation products" in a broad sense without reference to whether the product is a true sulfonate or whether it is a sulfuric acid ester.

The allyl radical of the above dodecyl allyl carbonate can be replaced by any other alkenyl radical of 3 to 6 carbon atoms, the term "alkenyl radical" meaning herein any univalent radical derived from an alkene by removing a hydrogen atom from one of the saturated carbon atoms thereof, thus having the general formula $C_nH_{2n-1}$. Such radicals remain after removing an alcoholic hydroxyl group from mono-olefinic, monohydric aliphatic alcohols of 3 to 6 carbon atoms. Non-limiting examples of such alcohols, the alkenyl residues of which can be substituted for the allyl group of dodecyl allyl carbonate, are methallyl, crotyl and 2-methyl crotyl alcohols, methyl vinyl carbinol, 3-methyl-3-butene-1-ol, 4-pentene-1-ol, 4-methyl-4-pentene-1-ol and 3-butene-1-ol. The products of such substitution can be sulfonated to yield the wetting, sudsing and washing agents of our invention. Especially suitable, both because of the efficiency of the sulfonated products which they yield and because of their ready availability and cheapness, are allyl, methallyl and crotyl alcohols. Unsaturated monovalent hydrocarbon radicals in which the free valence bond is attached to an unsaturated carbon atom (such for example as the vinyl radical) are unsatisfactory for our purpose, due inter alia to the instability of the carbonic diesters thereof when treated with sulfonating agents. When the number of carbon atoms in the alkenyl radical much exceeds six, troubles with solubility are encountered and the desired polar-nonpolar balance of the molecule appears to be affected adversely.

The dodecyl radical of the above dodecyl allyl carbonate can be replaced by the alkyl radical remaining after removing an alcoholic hydroxyl group from any high molecular weight alkyl hydroxide, the term "high molecular weight" being used herein to designate compounds of about 8 to 30 carbon atoms. We use the expression "alkyl hydroxide" herein because of its preciseness in excluding unsaturated or polyhydric alcohols or related alcohol-like compounds containing atoms other than carbon, hydrogen and oxygen, such for example as monoethanolamine and the various alkylolamides, monohydroxy esters and monohydroxy ethers which are discussed hereinafter. Carbonic diesters of the above type in which the dodecyl radical is replaced by any high molecular weight alkyl radical can be converted by suitable sulfonation into efficient wetting, sudsing and washing agents. Of such alkyl hydroxides, the saturated straight chain primary alcohols of about 8 to 18 carbon atoms are especially suitable, such as those derived from animal and vegetable oils, fats and waxes. The mixed alcohols derived from coconut oil or other oils of the coconut oil group give particularly efficient products. By "oils of the coconut oil group" we mean to designate all vegetable seed oils or fats at least 50 per cent by weight of the combined fatty acids of which are lauric and/or myristic acids. These oils (many examples of which are given in Hilditch's "The Chemical Constitution of Natural Fats," second (1947) edition, pages 198–205) are commonly derived from the seed of members of the botanical families Lauraceae (tangkallak kernel oil for example), Myristicaceae (ucuhuba nut oil for example), Simarubaceae (dika nut oil for example), Vochysiaceae (joboty kernel oil for example), Salvadoraceae (khakan kernel oil for example), and more especially the Palmae family. Coconut oil is the outstandingg example of an oil derived from seed of the Palmae family, but other non-limiting examples of such oils are murumuru, tucuma, cohune, ouricoury, babassu and palm kernel oils.

The dodecyl radical can also be replaced by radicals of high molecular weight alkyl hydroxides not derived from fatty sources, such as the mixed secondary and branch chain alcohols obtained by hydrating olefines or by oxidizing petroleum hydrocarbons or by hydrogenating carbon monoxide.

The dodecyl radical of dodecyl allyl carbonate can also be replaced by radicals remaining after removing an alcoholic hydroxyl group from monohydroxy monoesters of high molecular weight saturated aliphatic monocarboxylic acids with low molecular weight saturated aliphatic dihydric alcohols, the term "low molecular weight" being used herein to designate compounds which contain not more than 6 carbon atoms, and the word "alcohol" in its common meaning to apply only to compounds which contain no atoms other than carbon, hydrogen and oxygen. Thus nitrogen-containing compounds such for example as the alkylol amines are not included in our use of the word. The resulting carbonic diesters are converted by suitable sulfonation into powerful wetting, sudsing and washing agents. The acid portion of these monoesters can be any saturated fatty acids of about 8 to 18 carbon atoms such as those derived from animal and vegetable oils, fats or waxes, and more especially the fatty acids of coconut oil or an oil of the coconut oil group, or it may be a high molecular weight synthetic acid such as those obtained by oxidizing paraffin hydrocarbons or petroleum, or directly by hydrogenating carbon monoxide (sometimes called the Fischer-Tropsch process), or indirectly by oxidizing the saturated or unsaturated hydrocarbons or oxygenated hydrocarbons resulting from this process. These monoesters can be derived from saturated aliphatic diols such as ethylene glycol and its polymerization products, or the various propane, butane, pentane and hexane diols.

The dodecyl radical of dodecyl allyl carbonate can also be replaced by radicals remaining after removing the alcoholic hydroxyl group from monoamides of substantially saturated high molecular weight aliphatic monocarboxylic acids with low molecular weight saturated alkylolamines having only one hydroxyl group and only one amino group. The resulting diesters are converted by suitable sulfonation into useful wetting, sudsing and washing agents. Examples of such alkylolamides are those of monoethanolamine, 2-amino-2-methyl propanol or 2-amino-1-butanol with the fatty acids or other monocarboxylic acids described in the preceding paragraph. The amides of fatty acids of coconut oil or of an oil of the coconut oil group with monoethanolamine give especially efficient and desirable products.

The dodecyl radical of dodecyl allyl carbonate can also be replaced by radicals remaining after removing the alcoholic hydroxyl group from monohydroxy ethers of high molecular weight alkyl hydroxides having only one hydroxyl group with saturated low molecular weight aliphatic dihydric alcohols. The resulting carbonic diesters are converted by suitable sulfonation into strong wetting, sudsing and washing agents. Examples of such monohydroxy ethers are the ethers of ethylene or propylene glycol or of diethylene or dipropylene glycol with (or the reaction products of ethylene oxide or propylene oxide with) saturated straight chain primary alcohols of about 8 to 18 carbon atoms, such as those derived from animal and vegetable oils, fats and waxes. The mixed alcohols derived from coconut oil or other oils of the coconut oil group give particularly efficient products. Other examples of these monohydroxy ethers are the ethers of low molecular glycols with secondary and branch chain alcohols such as are obtained by hydrating olefines or by oxidizing petroleum hydrocarbons or by hydrogenating carbon monoxide.

In general, the wetting, sudsing and washing agents of our invention can be prepared by sulfonating any carbonic diester of the formula $$R-O-\underset{\underset{O}{\parallel}}{C}-O-X$$

wherein R is a hydroxyl-free radical remaining after removing an alcoholic hydroxyl group from a member of the group of alcoholic compounds consisting of (a) high molecular weight alkyl hydroxides, (b) monoamides of saturated high molecular weight monocarboxylic aliphatic acids with low molecular weight saturated alkylolamines having only one hydroxyl group and only one amino group, (c) monohydroxy monoesters of saturated high molecular weight monocarboxylic aliphatic acids with saturated low molecular weight aliphatic dihydric alcohols, and (d) monohydroxy ethers of high molecular weight alkyl hydroxides having only one hydroxyl group with saturated low molecular weight aliphatic dihydric alcohols, and X is an alkenyl radical of 3 to 6 carbon atoms.

It will be seen that the requisite molecular characteristics of our unsulfonated compounds are (1) a terminal hydrocarbon chain of high molecular weight constituting, or in, R, and conferring hydrophobic properties upon its portion of the molecule, the radical R being free from ethylenic bonds, alcoholic hydroxyl groups, amino groups or benzene rings and hence not readily susceptible to sulfonation, (2) the carbonic acid nucleus.

$$-O-\underset{\underset{O}{\parallel}}{C}-O-$$

to serve as a linking agent, and (3) an alkenyl radical, X, of 3 to 6 carbon atoms, the ethylenic bond of which is susceptible to sulfonation, sulfonation thus conferring hydrophilic properties upon that portion of the molecule.

Some specific examples of the carbonic diesters which by suitable sulfonation can be converted into the wetting, sudsing and washing agents of our invention are:

$$C_{18}H_{37}-O-\underset{\underset{O}{\parallel}}{C}-OCH_2CH=CH_2$$

$$C_{12}H_{25}-O-\underset{\underset{O}{\parallel}}{C}-O-CH_2CH_2CH_2CH=CH_2$$

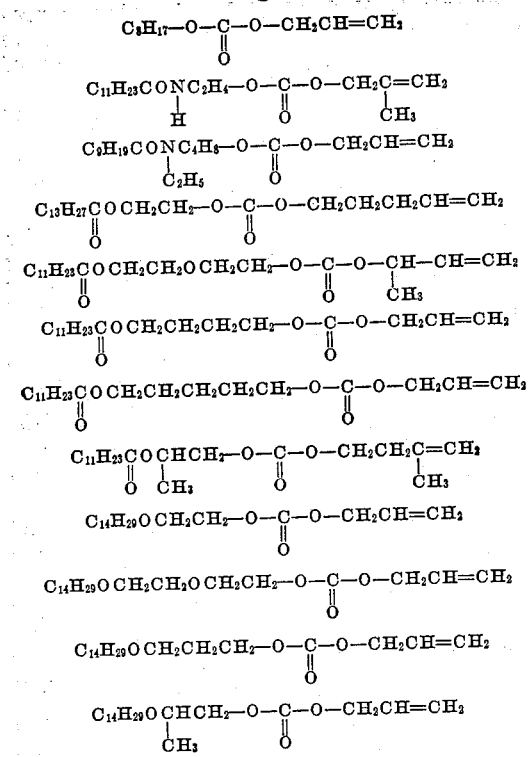

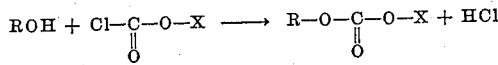

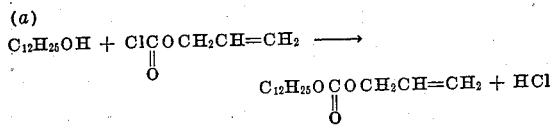

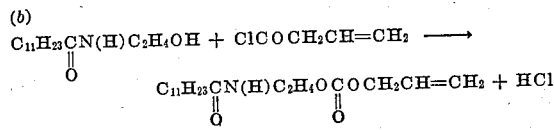

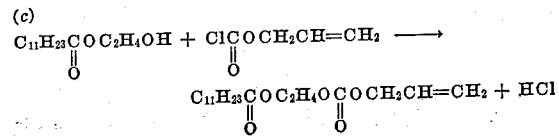

We do not wish to restrict ourselves to any particular method of making the unsulfonated carbonic diesters, but we find it convenient to esterify a chloroformate (or other halogenoformate) according to the equation:

$$ROH + Cl-\underset{\underset{O}{\|}}{C}-O-X \longrightarrow R-O-\underset{\underset{O}{\|}}{C}-O-X + HCl$$

where R is a hydroxyl-free radical remaining after removing an alcoholic hydroxyl group from a member of the group of alcoholic compounds consisting of (a) high molecular weight alkyl hydroxides, (b) monoamides of saturated high molecular weight monocarboxylic aliphatic acids with low molecular weight saturated alkylolamines having only one hydroxyl group and only one amino group, (c) monohydroxy monoesters of saturated high molecular weight monocarboxylic aliphatic acids with saturated low molecular weight aliphatic dihydric alcohols, and (d) monohydroxy ethers of high molecular weight alkyl hydroxides with saturated low molecular weight aliphatic dihydric alcohols, and X is an alkenyl radical of 3 to 6 carbon atoms. The following specific examples illustrate such esterifications:

(a)

$$C_{12}H_{25}OH + ClCOCH_2CH=CH_2 \longrightarrow C_{12}H_{25}OCOCH_2CH=CH_2 + HCl$$

(b)

$$C_{11}H_{23}CN(H)C_2H_4OH + ClCOCH_2CH=CH_2 \longrightarrow C_{11}H_{23}CN(H)C_2H_4OCOCH_2CH=CH_2 + HCl$$

(c)

$$C_{11}H_{23}COC_2H_4OH + ClCOCH_2CH=CH_2 \longrightarrow C_{11}H_{23}COC_2H_4OCOCH_2CH=CH_2 + HCl$$

(d)

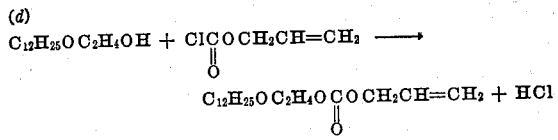

It will be perceived that the same product as in (a) above can be obtained by the reaction of equation (e) below:

(e)

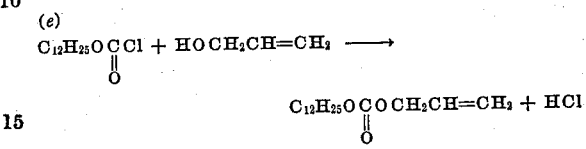

or by the general reaction

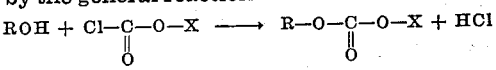

where both R and X represent hydrocarbon residues of monohydric aliphatic alcohols after removing the alcoholic hydroxyl group therefrom, the residue represented by either one of these symbols being that of a high molecular weight alkyl hydroxide having only one hydroxyl group and the residue represented by the other symbol being an alkenyl radical of 3 to 6 carbon atoms.

The above esterifications can be carried out in known manner, a suitable solvent medium and an "acid acceptor" for the halogen acid which is split off being commonly used. Tertiary amines such as pyridine, quinoline, picoline, triethylamine and the like, having no substituent groups which react with acid chlorides, are suitable acid acceptors. Following esterification, the resulting carbonic diesters are purified by distillation under reduced pressure, and are then ready for sulfonation.

Sulfonation of the mono-olefinic diesters of carbonic acid can be effected in known manner with chlorsulfonic acid, but we find it particularly economical and satisfactory to sulfonate with oleum containing from 30% to 60% free SO₃, adding the oleum to the ester in such manner and amount that the molar ratio of free SO₃ added:diester shall be above line B of Figure 1 hereof (wherein this molar ratio is plotted as ordinate against the percent free SO₃ by weight in the oleum as abscissa) when all of the oleum has been added but at no time during the addition lies substantially above line A. Under such controlled sulfonating conditions, we find that the ester linkages are preserved largely intact, oxidation is avoided, and a high degree of sulfonation is effected. In case oleum of about 60% free SO₃ content is used, this molar ratio should be at least 1.7:1 when all of the oleum has been added but at no time during the addition should it substantially exceed 2.3:1. During sulfonation, the temperature should not be allowed to rise substantially above 60° C., lest undesirable side reactions occur.

After the sulfonation reaction is complete, the acid reaction mixture is neutralized with an alkaline-reacting agent which gives a water-soluble salt therewith, sodium hydroxide for example. Neutralization is carried out under such conditions as to minimize any splitting of the ester, i. e. at a temperature not substantially above 50° C. to a pH between 4.5 and 7.5 and in such a manner as to avoid high alkalinity during the neutralization. Thus it is preferable to add the neutralizing alkali to the acid reaction mixture rather than the reverse, but best results are obtained by employing some form of the dominant bath technique, as for example by simultaneously adding roughly equivalent streams of acid reaction mixture and caustic soda solution to a dominant bath consisting originally of a large volume of cold water, e. g. an amount of ice water and crushed ice three or four times the weight of the acid mixture to be neutralized. In such a procedure, efficient stirring is required and the rates of addition of the two streams are so controlled that the pH of the dominant bath of neutralized material never varies substantially from the range pH 4.5 to 7.5. The integrity of the ester linkages can be maintained by such precautions, and efficient wetting, sudsing and washing agents are obtained.

Various organic diluents or thinning agents may be used in the sulfonation, such as saturated aliphatic ethers, hydrocarbons and chlorinated hydrocarbons, of which di-isopropyl ether, hexane, carbon tetrachloride, chloroform, and ethylene dichloride are examples. In order to be effective in making the reaction less drastic and in restraining side reactions, the amount of such thinning agent should be at least one third of the weight of the high molecular diesters to be sulfonated.

Especially high degree of sulfonation and products of especially good color, accompanied by a minimum of splitting of ester linkages and other side reactions, result from the use, as diluents, of low molecular saturated aliphatic esters having the chemical formula

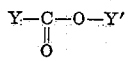

where Y is an alkyl group of from 1 to 3 carbon atoms and Y' is an alkyl group of from 1 to 5 carbon atoms. Thus the methyl, ethyl, propyl, isopropyl and the isomeric butyl and amyl esters of acetic, propionic, butyric or isobutyric acids may be used. In general, the effectiveness of these esters tends to decrease with increasing length of the acyl chain. Ethyl acetate is our preferred diluent or thinning agent because of its combined high efficiency and low cost. To be effective, the weight of such low molecular ester should be at least one fourth the weight of the high molecular diesters to be sulfonated. Such ester thinning agents make possible the employment of lower proportions of sulfonating agent and of higher temperatures of reaction, and a high degree of completeness of sulfonation is attained. In their presence we find that oleum containing from 30% to 60% by weight of free $SO_3$ should be added to the diesters in such manner and amount that the molar ratio of free $SO_3$ added:diester is above line B of Figure 2 hereof (wherein again this molar ratio is plotted against the strength of the oleum) when all of the oleum has been added, but at no time during the addition should it lie substantially above line A thereof. In case oleum of 60% strength is used, this molar ratio should be at least 1.5:1 when all of the oleum has been added but at no time during the addition should it substantially exceed 1.8:1. During the sulfonation reaction the temperature should not be allowed to rise substantially above 65° C. Neutralization conditions should be essentially the same in the presence of ethyl acetate or other low molecular saturated aliphatic ester as in its absence.

The following examples, in which all parts are by weight, illustrate suitable procedures for sulfonating our unsaturated diester carbonates.

*Example 1.*—Dodecyl allyl carbonate was prepared by stirring 69 parts of allyl chloroformate dissolved in 60 parts of benzene into 93 parts of dodecyl alcohol dissolved in 60 parts of pyridine. One hour was required for the addition, during which time the temperature was held between 5° and 15° C. by external cooling. The mixture was stirred for an additional 1.5 hours and then stood overnight at room temperature. Excess chloroformate and pyridine were removed by washing with 750 parts of water. After drying and stripping off the volatile solvent, the ester was distilled at 125–130° C. under a pressure of 1.5 mm. of mercury. The yield was 92% of theoretical. Saponification value was 376, against theoretical saponification value of 358.

One hundred parts of this ester were dissolved in 74 parts of ethylene dichloride, and to this 106 parts of oleum containing about 60% free $SO_3$ were added slowly, with efficient stirring. By external cooling, the temperature was kept between 35° and 40° C. Ten minutes were allowed for sulfonation, at the end of which time the reaction mixture was neutralized to methyl orange by diluting it with several times its own weight of ice water and adding caustic soda solution thereto slowly and with constant stirring to avoid local excesses of alkali or local overheating. The temperature was kept well below 50° C. during neutralization. The resulting paste was light in color, dissolved readily in water, formed no precipitate in hard water, and possessed marked wetting, sudsing and washing power in hard water. A portion of this product was purified by separating therefrom matter insoluble in 95% ethyl alcohol and matter soluble in petroleum ether. Analysis of this purified product indicated that it was chiefly sodium sulfonate of dodecyl allyl carbonate, with smaller proportions of sodium dodecyl sulfate and perhaps other sulfuric reaction products of high molecular weight.

If in the first step of Example 1 about 126 parts of the coconut oil fatty acid amide of monoethanolamine instead of dodecyl alcohol are reacted with the allyl chloroformate, the allyl carbonic acid ester of the alkylolamide is obtained, and by sulfonating 125 parts of this carbonic diester with 106 parts of oleum as in Example 1, a product is again obtained having good wetting, sudsing and washing power in hard water. Essentially similar results are also obtained when 126 parts of the coconut fatty acid monoester of ethylene glycol are used instead of the monoethanolamide in the modification just described, 125 parts of the resulting carbonic diester being sulfonated with 106 parts of oleum as in Example 1. Essentially similar results are also obtained when 120 parts of the monoether of coconut oil fatty alcohols with ethylene glycol are used instead of the monoethanolamide in the modification just described, 120 parts of the resulting carbonic diester being sulfonated with 106 parts of oleum as in Example 1.

*Example 2.*—One hundred parts of dodecyl allyl carbonate, prepared as in Example 1, were dissolved in 66 parts of ethyl acetate, and to this solution 100 parts of oleum containing about 60% free $SO_3$ were added slowly, with efficient stirring. Temperature, time of sulfonation and neutralization procedure were as described in Example 1. The resulting product was light in color, dissolved readily in water, formed no precipitate in hard water, and possessed marked wetting, sudsing and washing properties in hard water. Analysis indicated that a complex mixture of true sulfonates and sulfuric acid esters was present.

Similar sulfonation products of good wetting, sudsing and washing properties, are obtained when approximately 100 parts of dodecyl methallyl carbonate or of dodecyl crotyl carbonate are used instead of dodecyl allyl carbonate in Example 2, the rest of the procedure being substantially as therein described.

It will be understood that for some purposes the sulfuric reaction products can be used without neutralization, but for most purposes neutralization, as with sodium hydroxide, sodium carbonate, ammonium hydroxide, amines or other nitrogen bases for example, to give water-soluble salts is required. The neutralized sulfonated products of our invention can be treated in conventional manner to remove unsulfonated organic matter, inorganic salts, etc., or they can if desired be used without purifying. Conventional drying methods, such as drum drying, vacuum drum drying, spray drying and the like can also be applied to our products, if desired. The physical character of the product, whether it be in bar, flake, granule, powder, paste or other form, is not a limitation upon our invention. Furthermore, our product can if desired be used in conjunction with soap or with other organic detergents such for example as alkyl sulfates and sulfonates or with non-ionic detergents or with inorganic salts such for example as sodium sulfate, sodium chloride, sodium carbonate, sodium bicarbonate, sodium silicate, sodium ortho-, pyro-, tri-, tetra- or meta-phosphate and the like, or with relatively unreactive organic compounds such for example as starch, urea, high molecular aliphatic alcohols, fatty acid monoglycerides, fatty acid amides and the like.

This is a continuation-in-part of our abandoned application Serial No. 72,785, filed January 26, 1949.

Having thus described our invention, what we claim and desire to secure by Letters Patent is:

1. As new wetting, sudsing and washing agents, the sulfonation products of carbonic acid diesters of the formula

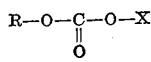

where R represents a hydroxyl-free alkyl radical containing about 8 to 30 carbon atoms said radical being obtained by removing an alcoholic hydroxyl group from a member of the group of alcoholic compounds consisting of (a) high molecular weight alkyl hydroxides having only one hydroxyl group, (b) monoamides of saturated high molecular weight monocarboxylic aliphatic acids with low molecular weight saturated alkylolamines having only one hydroxyl group and only one amino group, (c) monohydroxy monoesters of saturated high molecular weight monocarboxylic aliphatic acids with low molecular weight saturated aliphatic dihydric alcohols, and (d) monohydroxy ethers of high molecular weight alkyl hydroxides having only one hydroxyl group with saturated low molecular weight aliphatic dihydric alcohols, and X is an alkenyl radical of 3 to 6 carbon atoms.

2. The wetting, sudsing and washing agents of claim 1 where R represents a hydroxyl-free radical remaining after removing an alcoholic hydroxyl group from a high molecular weight alkyl hydroxide having only one hydroxyl group.

3. The wetting, sudsing and washing agents of claim 2 in which the alkyl hydroxide is a straight chain primary alcohol of about 8 to 18 carbon atoms.

4. The wetting, sudsing and washing agents of claim 2 in which the alkyl hydroxide is the mixed alcohols of coconut oil.

5. The wetting, sudsing and washing agents of claim 1 where R represents a hydroxyl-free radical remaining after removing an alcoholic hydroxyl group from a monoamide of a saturated high molecular weight monocarboxylic aliphatic acid with a low molecular weight saturated alkylolamine having only one hydroxyl group and only one amino group.

6. The wetting, sudsing and washing agents of claim 5 where the monoamide is that of a saturated fatty acid of 8 to 18 carbon atoms with a low molecular weight saturated alkylolamine having only one hydroxyl group and only one amino group.

7. The wetting, sudsing and washing agents of claim 5 where the monoamide is the monoethanolamide of coconut oil fatty acids.

8. The wetting, sudsing and washing agents of claim 1 where R represents a hydroxyl-free radical remaining after removing an alcoholic hydroxyl group from a monohydroxy monoester of a saturated high molecular weight monocarboxylic aliphatic acid with a low molecular weight saturated aliphatic dihydric alcohol.

9. The wetting, sudsing and washing agents of claim 8 where the monoester is that of a saturated fatty acid of about 8 to about 18 carbon atoms with a low molecular weight saturated aliphatic dihydric alcohol.

10. The wetting, sudsing and washing agents of claim 8 where the monoester is that of ethylene glycol and coconut oil fatty acids.

11. The wetting, sudsing and washing agents of claim 1 where R represents a hydroxyl-free radical remaining after removing an alcoholic hydroxyl group from a monohydroxy ether of a high molecular weight alkyl hydroxide having only one hydroxyl group with a low molecular weight aliphatic dihydric alcohol.

12. The wetting, sudsing and washing agents of claim 11 where the alkyl hydroxide is a saturated straight chain primary alcohol of about 8 to 18 carbon atoms.

13. The wetting, sudsing and washing agents of claim 11 where the ether is the monoether of coconut oil fatty alcohols with ethylene glycol.

14. The wetting, sudsing and washing agents of claim 1 wherein X is a member of the group consisting of allyl, methallyl and crotyl radicals.

15. The wetting, sudsing and washing agents of claim 1 wherein X is the allyl radical.

16. The process of preparing wetting, sudsing and washing agents from diesters of the formula

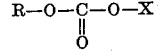

wherein R represents a hydroxyl-free radical remaining after removing an alcoholic hydroxyl group from a member of the group of alcoholic compounds consisting of (a) high molecular weight alkyl hydroxides having only one hydroxyl group, (b) monoamides of saturated high molecular weight monocarboxylic aliphatic acids with low molecular weight saturated alkylolamines having only one hydroxyl group and only one amino group, (c) monohydroxy monoesters of saturated high molecular weight monocarboxylic aliphatic acids with low molecular weight saturated aliphatic dihydric alcohols, and (d) monohydroxy ethers of high molecular weight alkyl hydroxides having only one hydroxyl group with saturated low molecular weight aliphatic dihydric alcohols; and X is an alkenyl radical of 3 to 6 carbon atoms, which process comprises mixing said diesters with oleum containing 30% to 60% by weight of free $SO_3$ to effect reaction between said diesters and said oleum thereby forming sulfonic acids, the oleum being added to the diesters in such manner and amount that the molar ratio of free $SO_3$ added:diester lies above line B of Figure 1 hereof when all of the oleum has been added but at no time during the addition lies substantially above line A, maintaining the temperature below 60° C. while the reaction takes place, and neutralizing the acid reaction mixture to form a water-soluble salt.

17. A process for preparing wetting, sudsing and washing agents which comprises mixing a carbonic acid diester as defined in claim 1 with (a) at least one fourth of its weight of a thinning agent having the chemical formula

Figure 2:
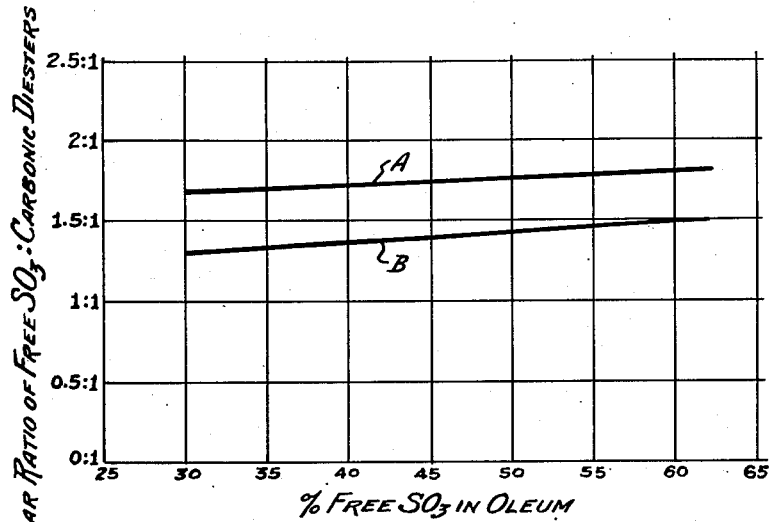

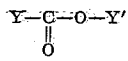

wherein Y is an alkyl group of from 1 to 3 carbon atoms and Y' is an alkyl group of from 1 to 5 carbon atoms and with (b) oleum containing about 30% to 60% free $SO_3$ by weight, thereby to effect reaction therewith, the oleum being added to the diester in such manner and amount that the molar ratio of free $SO_3$ added:diester lies above line B of Figure 2 hereof when all of the oleum has been added but at no time during the addition lies substantially above line A, maintaining the temperature below 65° C. while the reaction takes place, and neutralizing the acid reaction mixture to form a water-soluble salt.

18. A process of preparing wetting, sudsing and washing agents which comprises mixing dodecyl allyl carbonate, in the presence of at least one fourth its weight of ethyl acetate, with oleum containing about 60% free $SO_3$ by weight to effect reaction therewith, the oleum being added to the carbonate in such manner and amount that the molar ratio of free $SO_3$ added: carbonate is at least 1.5:1 when all of the oleum has been added but at no time during the addition substantially exceeds 1.8:1, maintaining the temperature below 65° C. while the reaction takes place, and neutralizing the acid reaction mixture with caustic soda.

19. A process for preparing wetting, sudsing and washing agents which comprises: (a) esterifying a chloroformate of the formula

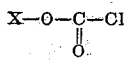

where X is an alkenyl radical of 3 to 6 carbon atoms, with an alcoholic compound of the formula ROH where R represents a hydroxyl-free radical remaining after removing an alcoholic hydroxyl group from a member of the group of alcoholic compounds consisting of (1) high molecular weight alkyl hydroxides having only one hydroxyl group, (2) monoamides of saturated high molecular weight monocarboxylic aliphatic acids with low molecular weight saturated alkylolamines having only one hydroxyl group and only one amino group, (3) monohydroxy monoesters of saturated high molecular weight monocarboxylic aliphatic acids with low saturated molecular weight aliphatic dihydric alcohols, and (4) monohydroxy ethers of high molecular weight alkyl hydroxides having only one hydroxy group with saturated low molecular weight aliphatic dihydric alcohols; (b) distilling the resulting diester under reduced pressure to purify same; (c) mixing the purified diester with at least one fourth of its own weight of ethyl acetate; (d) adding thereto oleum containing about 60% free $SO_3$ by weight to effect reaction therewith, the oleum being added in such manner and amount that the molar ratio of free $SO_3$ added:diester is at least 1.5:1 when all of the oleum has been added but at no time during the addition substantially exceeds 1.8:1; (e) maintaining the temperature of the reaction below 65° C.; and (f) neutralizing the acid reaction mixture with caustic soda.

20. A process for preparing wetting, sudsing and washing agents which comprises: (a) esterifying a chloroformate of the formula

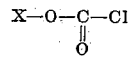

with an alcohol of the formula ROH, the symbols R and X representing hydrocarbon residues of monohydric aliphatic alcohols after removing the alcoholic hydroxyl group therefrom, the residue represented by either one of said symbols being that of a high molecular weight alkyl hydroxide having only one hydroxyl group and the residue represented by the other symbol being an alkenyl radical of 3 to 6 carbon atoms; (b) purifying the resulting diester by distillation under reduced pressure; (c) mixing the purified diester with at least one fourth of its own weight of ethyl acetate; (d) adding thereto oleum containing about 60% free $SO_3$ by weight to effect reaction therewith, the oleum being added in such manner and amount that the molar ratio of free $SO_3$ added : diester is at least 1.5:1 when all of the oleum has been added but at no time during the addition substantially exceeds 1.8:1; (e) maintaining the temperature of the acid reaction mixture below 65° C.; and (f) neutralizing the acid reaction mixture at a temperature below 50° C. by adding said mixture and caustic soda solution simultaneously and at roughly equivalent rates to a large volume of cold water, the rates of addition being so controlled that the pH during neutralization remains between 4.5 and 7.5.

JOHN S. BROD.
RONALD A. HENRY.

REFERENCES CITED

The following references are of record in the file of this patent:

UNITED STATES PATENTS

| Number | Name | Date |
|---|---|---|
| 2,136,379 | Flett | Nov. 15, 1938 |
| 2,184,794 | DeGroote | Dec. 26, 1939 |
| 2,212,521 | Harris | Aug. 27, 1940 |
| 2,377,111 | Strain | May 29, 1945 |
| 2,390,551 | Muskat | Dec. 11, 1945 |